（12）United States Patent
Wang

(10) Patent No.: US 10,993,305 B2
(45) Date of Patent: Apr. 27, 2021

(54) WIRELESS RECEIVING CIRCUIT AND WIRELESS CONTROL DEVICE

(71) Applicant: Yan Wang, Sichuan (CN)

(72) Inventor: Yan Wang, Sichuan (CN)

( * ) Notice: Subject to any disclaimer, the term of this patent is extended or adjusted under 35 U.S.C. 154(b) by 0 days.

(21) Appl. No.: 16/722,070

(22) Filed: Dec. 20, 2019

(65) Prior Publication Data

US 2021/0059032 A1 Feb. 25, 2021

(30) Foreign Application Priority Data

Aug. 20, 2019 (CN) .......................... 201921353840.0

(51) Int. Cl.
*H05B 47/19* (2020.01)
*H04W 4/00* (2018.01)
*H04W 4/80* (2018.01)

(52) U.S. Cl.
CPC .............. *H05B 47/19* (2020.01); *H04W 4/80* (2018.02)

(58) Field of Classification Search
CPC ....... H04W 4/80; H04W 8/005; H04W 12/80; H05B 47/16; H05B 47/19
See application file for complete search history.

(56) References Cited

U.S. PATENT DOCUMENTS

| | | | | |
|---|---|---|---|---|
| 9,692,417 B1 * | 6/2017 | Rezayee | ............... | H03K 5/1252 |
| 2003/0060176 A1 * | 3/2003 | Heinonen | ............ | H03B 5/1243 |
| | | | | 455/255 |
| 2003/0076262 A1 * | 4/2003 | Forrester | ................ | H01Q 1/242 |
| | | | | 343/700 MS |
| 2004/0021635 A1 * | 2/2004 | Lou | ........................ | G06F 1/3271 |
| | | | | 345/163 |
| 2006/0154642 A1 * | 7/2006 | Scannell, Jr. | ........... | F21V 33/00 |
| | | | | 455/404.1 |
| 2007/0053693 A1 * | 3/2007 | Houck | ............... | H04B 10/1149 |
| | | | | 398/117 |
| 2007/0132733 A1 * | 6/2007 | Ram | ................... | G06F 3/03544 |
| | | | | 345/163 |
| 2015/0159895 A1 * | 6/2015 | Quam | .................. | H04L 67/025 |
| | | | | 700/275 |
| 2015/0373796 A1 * | 12/2015 | Bahrehmand | .......... | H05B 45/37 |
| | | | | 315/129 |
| 2017/0013695 A1 * | 1/2017 | Kelley | .................... | H05B 47/11 |
| 2017/0064494 A1 * | 3/2017 | Zhu | ........................ | H04W 4/80 |
| 2017/0223484 A1 * | 8/2017 | Zhu | ........................ | A61B 5/002 |

(Continued)

*Primary Examiner* — Amy Cohen Johnson
*Assistant Examiner* — Syed M Kaiser
(74) *Attorney, Agent, or Firm* — Jordan IP Law, LLC; Todd A. Vaughn

(57) ABSTRACT

A wireless receiving circuit and a wireless control device. The wireless receiving circuit includes a signal receiving module, a Bluetooth signal processing module, a voltage stabilization module, and an output control module. An output end of the signal receiving module is connected with an input end of the Bluetooth signal processing module, and a voltage end of the Bluetooth signal processing module is connected with an output end of the voltage stabilization module. An output end of the Bluetooth signal processing module is connected with an input end of the output control module. The signal receiving module is to receive an external Bluetooth signal and is to transmit the signal to the Bluetooth signal processing module. The Bluetooth signal processing module is to process the external Bluetooth signal and is to transmit a control signal to the output control module.

18 Claims, 3 Drawing Sheets

(56) References Cited

U.S. PATENT DOCUMENTS

| | | | |
|---|---|---|---|
| 2017/0265164 A1* | 9/2017 | Wiser | H04W 72/005 |
| 2017/0265260 A1* | 9/2017 | Briggs | H05B 47/19 |
| 2017/0367104 A1* | 12/2017 | Raisoni | H04W 72/12 |
| 2018/0027598 A1* | 1/2018 | Roquemore, III | H04M 11/00 370/254 |
| 2018/0062639 A1* | 3/2018 | Rezayee | H03K 17/223 |
| 2018/0161018 A1* | 6/2018 | Kushon | A61B 5/150343 |
| 2018/0376571 A1* | 12/2018 | Zhang | H04W 4/80 |
| 2019/0106867 A1* | 4/2019 | Mariano | F16K 31/06 |
| 2020/0105140 A1* | 4/2020 | Wang | G08G 1/146 |
| 2020/0162115 A1* | 5/2020 | Feng | H03F 1/565 |

* cited by examiner

WIRELESS RECEIVING CIRCUIT AND WIRELESS CONTROL DEVICE

CROSS-REFERENCE TO RELATED APPLICATION

The present application is based upon and claims priority to Chinese Patent Application No. 2019213538400 (filed on Aug. 20, 2019), the entire content of which is incorporated herein by reference.

TECHNICAL FIELD

The present disclosure belongs to the field of control technologies, and in particular, to a wireless receiving circuit and a wireless control device.

BACKGROUND

With the development of electronic technology, the electronic technology is widely applied to various fields so as to be gradually deeply known and increasingly highly required by people. To a wireless control device such as a light strip, a light string and the like, because the light string has complex changes, transmission stability requirements on the wireless control device are higher and higher, but the traditional wireless control device has complex structure, high costs and poor signal transmission stability.

SUMMARY

In view of this, embodiments of the present disclosure provide a wireless receiving circuit and a wireless control device to solve problems that the wireless control device has complex structure, high costs and poor signal transmission stability in the prior art.

The first embodiment of the present disclosure provides a wireless receiving circuit, which comprises a signal receiving module, a BLUETOOTH signal processing module, a voltage stabilization module and an output control module; BLUETOOTH is a short-range radio frequency (RF)-based connectivity for portable personal devices;

an output end of the signal receiving module is connected with an input end of the BLUETOOTH signal processing module; a voltage end of the BLUETOOTH signal processing module is connected with an output end of the voltage stabilization module, and an output end of the BLUETOOTH signal processing module is connected with an input end of the output control module; a voltage end of the voltage stabilization module and a voltage end of the output control module are connected with an external power supply; and the signal receiving module receives an external BLUETOOTH signal and transmits the signal to the BLUETOOTH signal processing module, the BLUETOOTH signal processing module processes the external BLUETOOTH signal and transmits a control signal to the output control module, meanwhile, the voltage stabilization module conducts voltage stabilization processing on the BLUETOOTH signal processing module, and the output control module controls an external device connected with the output control module according to the control signal.

Preferably, the signal receiving module comprises a BLUETOOTH antenna and the first capacitor; and the BLUETOOTH antenna is connected with the first end of the first capacitor while the second end of the first capacitor is connected with the output end of the signal receiving module.

Preferably, the signal receiving module further comprises the second capacitor and the third capacitor; and the first end of the first capacitor is connected with the first end of the second capacitor while the second end thereof is connected with the first end of the third capacitor; and the second end of the second capacitor and the second end of the third capacitor are grounded.

Preferably, the BLUETOOTH signal processing module comprises a BLUETOOTH signal processing chip, a crystal oscillation unit and the fourth capacitor; and an input pin of the BLUETOOTH signal processing chip is connected with the input end of the BLUETOOTH signal processing module, the first clock pin and the second clock pin of the BLUETOOTH signal processing chip are connected with the crystal oscillation unit, a power supply pin of the BLUETOOTH signal processing chip is connected with the voltage end of the BLUETOOTH signal processing module, and a signal output pin of the BLUETOOTH signal processing chip is connected with the output end of the BLUETOOTH signal processing module; and the first end of the fourth capacitor is connected with the power supply pin of the BLUETOOTH signal processing chip while the second end thereof is grounded.

Preferably, the crystal oscillation unit comprises the first resistor, a crystal oscillation component, the fifth capacitor and the sixth capacitor; and the first end of the first resistor is connected with the first clock pin of the BLUETOOTH signal processing chip while the second end thereof is connected with the first end of the crystal oscillation component and the first end of the fifth capacitor; the second end of the crystal oscillation component is connected with the first end of the sixth capacitor and the second clock pin of the BLUETOOTH signal processing chip; and the second end of the fifth capacitor and the second end of the sixth capacitor are grounded.

Preferably, the voltage stabilization module comprises a voltage stabilization chip, the seventh capacitor and the eighth capacitor; and a voltage pin of the voltage stabilization chip is connected with the voltage end of the voltage stabilization module and the first end of the seventh capacitor, and an output pin of the voltage stabilization chip is connected with the output end of the voltage stabilization module and the first end of the eighth capacitor; and the second end of the seventh capacitor and the second end of the eighth capacitor are grounded.

Preferably, the voltage stabilization chip is an HT7133 chip.

Preferably, the output control module comprises the second resistor, a switch control component, the third resistor and a communication interface; and the first end of the second resistor is connected with the input end of the output control module while the second end thereof is connected with the first end of the switch control component; the second end of the switch control component is connected with the first end of the third resistor and the first end of the communication interface, and the third end of the switch control component is grounded; and the second end of the third resistor is connected with the voltage end of the output control module.

Preferably, the switch control component is a triode.

The second embodiment of the present disclosure provides a wireless control device, comprising any one of the wireless receiving circuits provided by the first embodiment.

Compared with the prior art, the embodiments of the present disclosure have the beneficial effects: the wireless receiving circuit mainly comprises the signal receiving module, the BLUETOOTH signal processing module, the voltage stabilization module and the output control module, and has simple structure and low costs, wherein the signal receiving module receives the external BLUETOOTH signal and transmits the signal to the BLUETOOTH signal processing module, the BLUETOOTH signal processing module processes the external BLUETOOTH signal and transmits the control signal to the output control module, meanwhile, the voltage stabilization module conducts the voltage stabilization processing on the BLUETOOTH signal processing module, and the output control module controls the external device connected with the output control module according to the control signal, so the signal transmission stability is higher than infrared transmission stability, and the reliability is high.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

DESCRIPTION OF THE EMBODIMENTS

In the following description, specific details such as particular system structure and technique are described, which are for illustration purpose only to provide a thoroughly understanding of embodiments of the present disclosure, but shall not be used to limit the scope of the present disclosure. However, it should be clear to those skilled in the art that the present disclosure may be implemented by other embodiments without such details. In other instances, a details description of the known system, device, circuit and method are omitted herein to prevent the unnecessary details from obscuring the principle of the present disclosure.

The following describes technical solutions of the present disclosure by means of specific embodiments.

Figure 1:
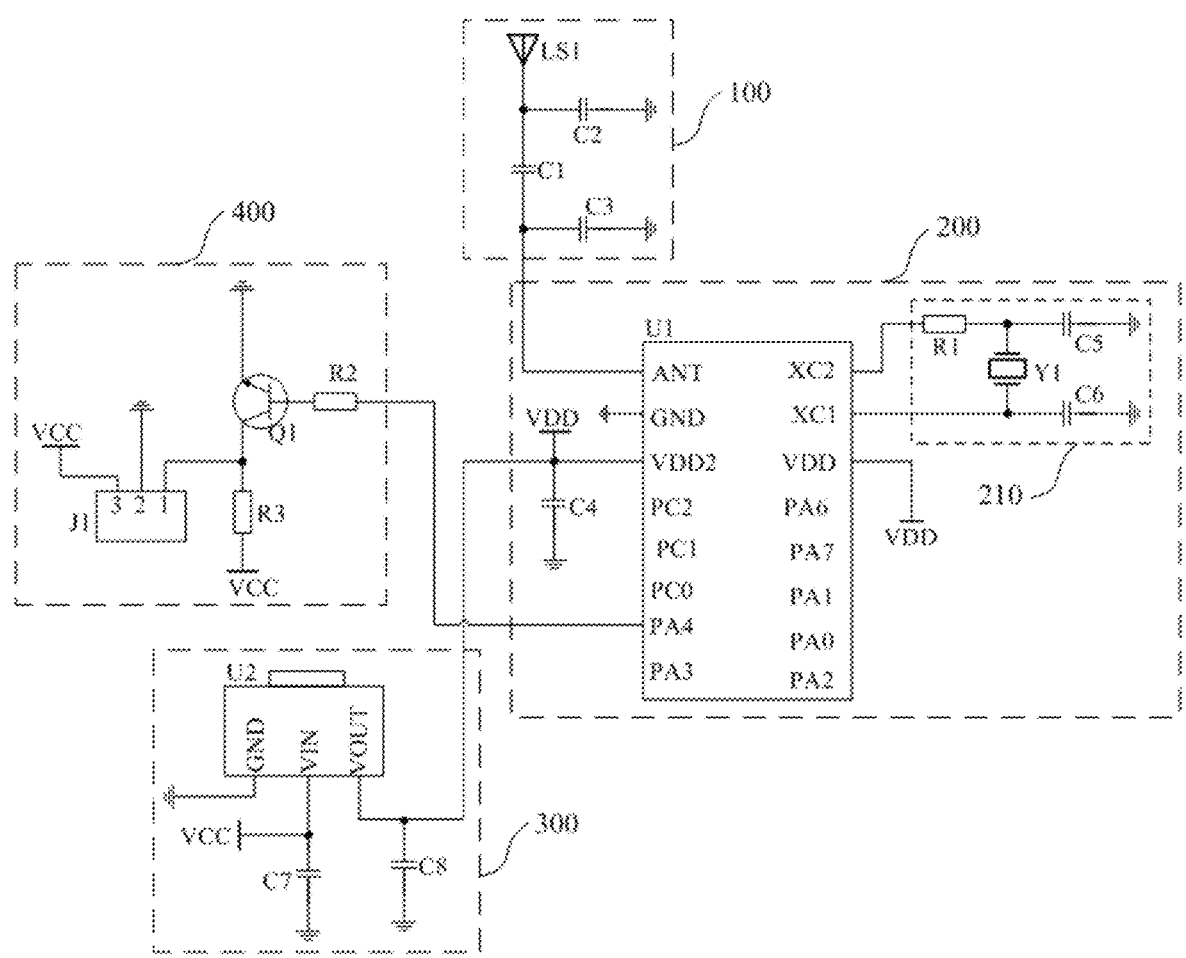
FIG. 1 is a schematic diagram of a wireless receiving circuit provided by embodiments of the present disclosure.

Referring to FIG. 1, an embodiment provides a wireless receiving circuit, which comprises a signal receiving module 100, a BLUETOOTH signal processing module 200, a voltage stabilization module 300 and an output control module 400; an output end of the signal receiving module 100 is connected with an input end of the BLUETOOTH signal processing module 200; a voltage end of the BLUETOOTH signal processing module 200 is connected with an output end of the voltage stabilization module 300, and an output end of the BLUETOOTH signal processing module 200 is connected with an input end of the output control module 400; and a voltage end of the voltage stabilization module 300 and a voltage end of the output control module 400 are connected with an external power supply, and an output end of the output control module 400 is connected with an external device, wherein the external device is controlled by the wireless receiving circuit.

According to one embodiment, the external device may be a light string, a light bar, a light strip or a light emitting diode (LED) and the like in the lighting field, and the wireless receiving circuit of the embodiment receives and processes a BLUETOOTH signal transmitted by an external terminal and finally transmits the signal to a driving chip of the light string, the light bar or the light strip so as to control a lighting state and the like of the light string, the light bar or the light strip. Specifically, the signal receiving module 100 receives an external BLUETOOTH signal and transmits the signal to the BLUETOOTH signal processing module 200, the BLUETOOTH signal processing module 200 processes the external BLUETOOTH signal and transmits a control signal to the output control module 400, meanwhile, the voltage stabilization module 300 conducts voltage stabilization processing on the BLUETOOTH signal processing module 200, and the output control module 400 controls an external device connected with the output control module according to the control signal. The wireless receiving circuit of the embodiment can be further applied to any devices requiring wireless control, and the embodiment does not specifically limit specific application scenarios of the wireless receiving circuit.

Figure 2:
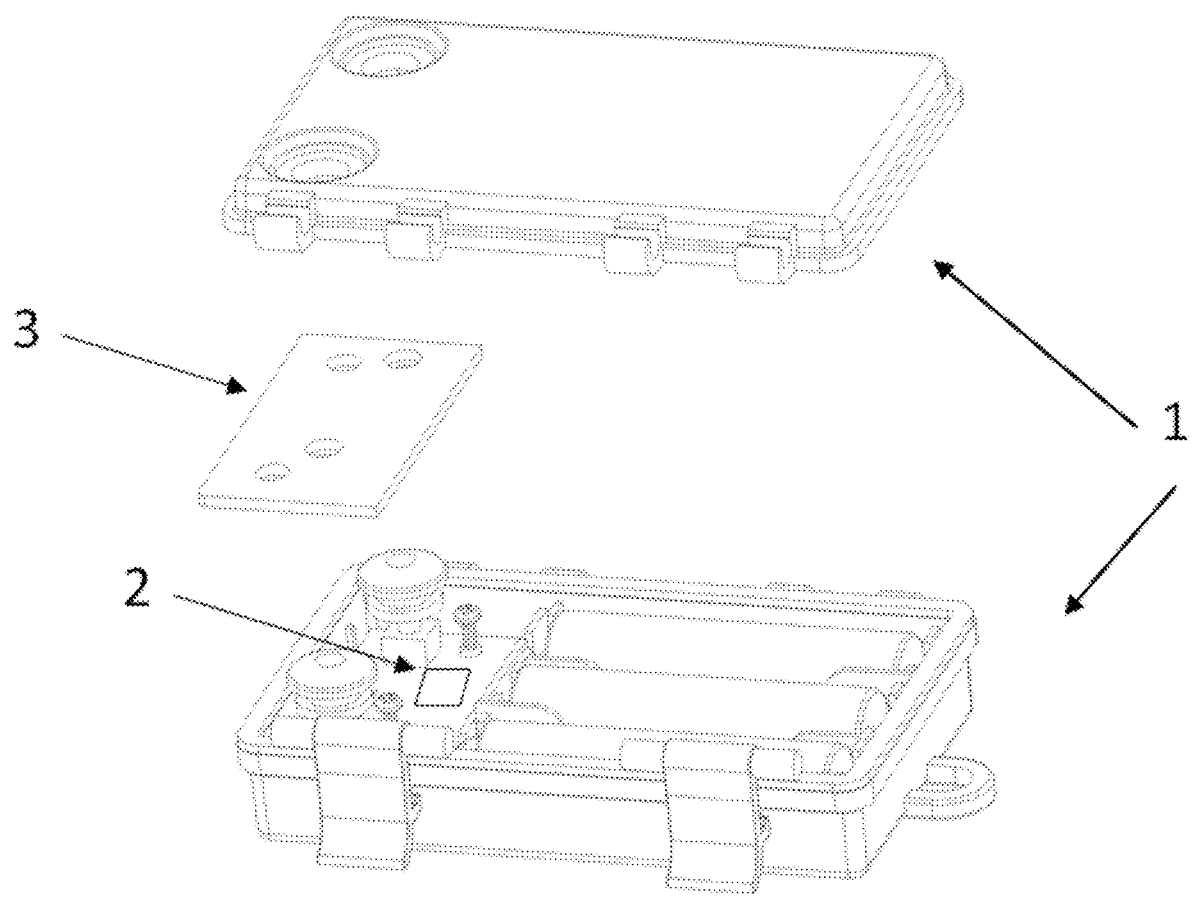
FIG. 2 is a schematic diagram of a battery box including the wireless receiving circuit according to the present disclosure.

Please refer to FIG. 2, for example, the wireless receiving circuit 2 of the embodiment is integrated in a battery box 2 of an LED light string and is connected with the battery box 1, a plate 3 is arranged on the wireless receiving circuit 2 and fix it to the bottom of the battery box 1. When a power supply in the battery box 1 is turned on, the wireless receiving circuit 2 starts working, a terminal is in BLUETOOTH connection with the wireless receiving circuit 2 and enters a remote control interface, the terminal transmits a BLUETOOTH signal to the wireless receiving circuit 2, the wireless receiving circuit 2 outputs a control signal to a driving chip of the LED light string, and the driving chip of the LED light string controls a lighting state of the light string according to the control signal.

The wireless receiving circuit has simple structure and low costs; and the signal receiving module 100 receives the external BLUETOOTH signal, the BLUETOOTH signal processing module 200 processes the external BLUETOOTH signal, and meanwhile, the voltage stabilization module 300 conducts the voltage stabilization processing on the BLUETOOTH signal processing module 200, so signal transmission stability is higher than infrared transmission stability, and reliability is high.

In one embodiment, the signal receiving module 100 may comprise a BLUETOOTH antenna LS1 and the first capacitor C1; and the BLUETOOTH antenna LS1 is connected with the first end of the first capacitor C1 while the second end of the first capacitor C1 is connected with the output end of the signal receiving module 100. The BLUETOOTH antenna LS1 is configured for receiving a BLUETOOTH signal transmitted by an external BLUETOOTH signal transmitting device and transmitting the BLUETOOTH signal to the BLUETOOTH signal processing module 200 through the first capacitor C1, and the first capacitor C1 is configured for conducting noise reduction processing on the BLUETOOTH signal to ensure reliability of the signal and reduce noise.

Preferably, the signal receiving module 100 of the embodiment further may comprise the second capacitor C2 and the third capacitor C3; and the first end of the first capacitor C1 is connected with the first end of the second capacitor C2 while the second end thereof is connected with the first end of the third capacitor C3; and the second end of the second capacitor C2 and the second end of the third capacitor C3 are grounded. The second capacitor C2 is configured for filtering a signal of the BLUETOOTH antenna LS1, and the third capacitor C3 is configured for filtering a BLUETOOTH signal input to the BLUETOOTH signal processing module 200 so as to ensure the reliability of the signal.

In one embodiment, the BLUETOOTH signal processing module 200 of the embodiment may comprise a BLUETOOTH signal processing chip U1, a crystal oscillation unit 210 and the fourth capacitor C4; an input pin ANT of the BLUETOOTH signal processing chip U1 is connected with the second end of the first capacitor C1, the first clock pin XC2 and the second clock pin XC1 of the BLUETOOTH signal processing chip U1 are connected with the crystal oscillation unit 210, a power supply pin VDD2 of the BLUETOOTH signal processing chip U1 is connected with the voltage end of the BLUETOOTH signal processing module 200, and a signal output pin PA4 of the BLUETOOTH signal processing chip U1 is connected with the output end of the BLUETOOTH signal processing module 200; and the first end of the fourth capacitor C4 is connected with the power supply pin VDD2 of the BLUETOOTH signal processing chip U1 while the second end thereof is grounded.

The crystal oscillation unit 210 is configured for providing a clock signal for the BLUETOOTH signal processing chip U1, and the fourth capacitor C4 is configured for filtering a voltage received by the BLUETOOTH signal processing chip U1 to ensure the stability of power supply. The embodiment does not specifically limit the BLUETOOTH signal processing chip U1 and the BLUETOOTH signal processing chip U1 may be any 2.4G BLUETOOTH processing chip, and its working voltage range may be from 2.2 V to 3.6 V.

Preferably, the crystal oscillation unit 210 may comprise the first resistor R1, a crystal oscillation component Y1, the fifth capacitor C5 and the sixth capacitor C6; the first end of the first resistor R1 is connected with the first clock pin XC2 of the BLUETOOTH signal processing chip U1 while the second end thereof is connected with the first end of the crystal oscillation component Y1 and the first end of the fifth capacitor C5; the second end of the crystal oscillation component Y1 is connected with the first end of the sixth capacitor C6 and the second clock pin XC1 of the BLUETOOTH signal processing chip U1; and the second end of the fifth capacitor C5 and the second end of the sixth capacitor C6 are grounded. A capacitance value of the fifth capacitor C5 and a capacitance value of the sixth capacitor C6 can be adjusted according to the crystal oscillation component Y1, and a distance between the crystal oscillation component Y1 and the BLUETOOTH signal processing chip U1 is as short as possible to avoid signal interference.

In one embodiment, the voltage stabilization module 300 comprises a voltage stabilization chip U2, the seventh capacitor C7 and the eighth capacitor C8; and a voltage pin of the voltage stabilization chip U2 is connected with the voltage end of the voltage stabilization module 300 and the first end of the seventh capacitor C7, and an output pin of the voltage stabilization chip U2 is connected with the output end of the voltage stabilization module 300 and the first end of the eighth capacitor C8; and the second end of the seventh capacitor C7 and the second end of the eighth capacitor C8 are grounded. Preferably, the voltage stabilization chip U2 of the embodiment may be an HT7133 chip to conduct voltage stabilization processing on the BLUETOOTH signal processing chip U1 so as to ensure regular operation of the BLUETOOTH signal processing chip U1 and reduce the signal interference and the noise. Specifically, a VIN pin of the HT7133 chip is connected with the external power supply and the first end of the seventh capacitor C7, and a VOUT pin of the HT7133 chip is connected with the power supply pin VDD2 of the BLUETOOTH signal processing chip U1 and the first end of the eighth capacitor C8. The embodiment does not limit the specific type of the voltage stabilization chip U2, the voltage of the external power supply cannot be greater than the maximum working voltage of the voltage stabilization chip U2, and the current of the external power supply should be greater than 30 mA.

In one embodiment, the output control module 400 may comprise the second resistor R2, a switch control component Q1, the third resistor R3 and a communication interface J1; and the first end of the second resistor R2 is connected with the signal output pin PA4 of the BLUETOOTH signal processing chip U1 while the second end thereof is connected with the first end of the switch control component Q1; the second end of the switch control component Q1 is connected with the first end of the third resistor R3 and the first end of the communication interface J1, and the third end of the switch control component Q1 is grounded; and the second end of the third resistor R3 is connected with the voltage end of the output control module 400. The switch control component Q1 can be conveniently communicated with the driving chip of the external device to reverse a level signal such that the driving chip of the external device is more accurate to receive a signal. Preferably, the switch control component Q1 of the embodiment may be a triode, a base of the triode is connected with the second end of the second resistor R2, a collector of the triode is connected with the first end of the third resistor R3 and the first end of the communication interface J1, and an emitter of the triode is grounded.

In the embodiment, the wireless receiving circuit mainly comprises the signal receiving module 100, the BLUETOOTH signal processing module 200, the voltage stabilization module 300 and the output control module 400, and has simple structure and low costs, wherein the signal receiving module 100 receives the external BLUETOOTH signal and transmits the signal to the BLUETOOTH signal processing module 200, the BLUETOOTH signal processing module 200 processes the external BLUETOOTH signal and transmits the control signal to the output control module 400, meanwhile, the voltage stabilization module 300 conducts the voltage stabilization processing on the BLUETOOTH signal processing module 200, and the output control module 400 controls the external device connected with the output control module according to the control signal, so the signal transmission stability is higher than infrared transmission stability, and the reliability is high.

The embodiment provides a wireless control device, comprising any one of the wireless receiving circuits in the above embodiments, and also having the beneficial effects of any one of the wireless receiving circuits.

Figure 3:
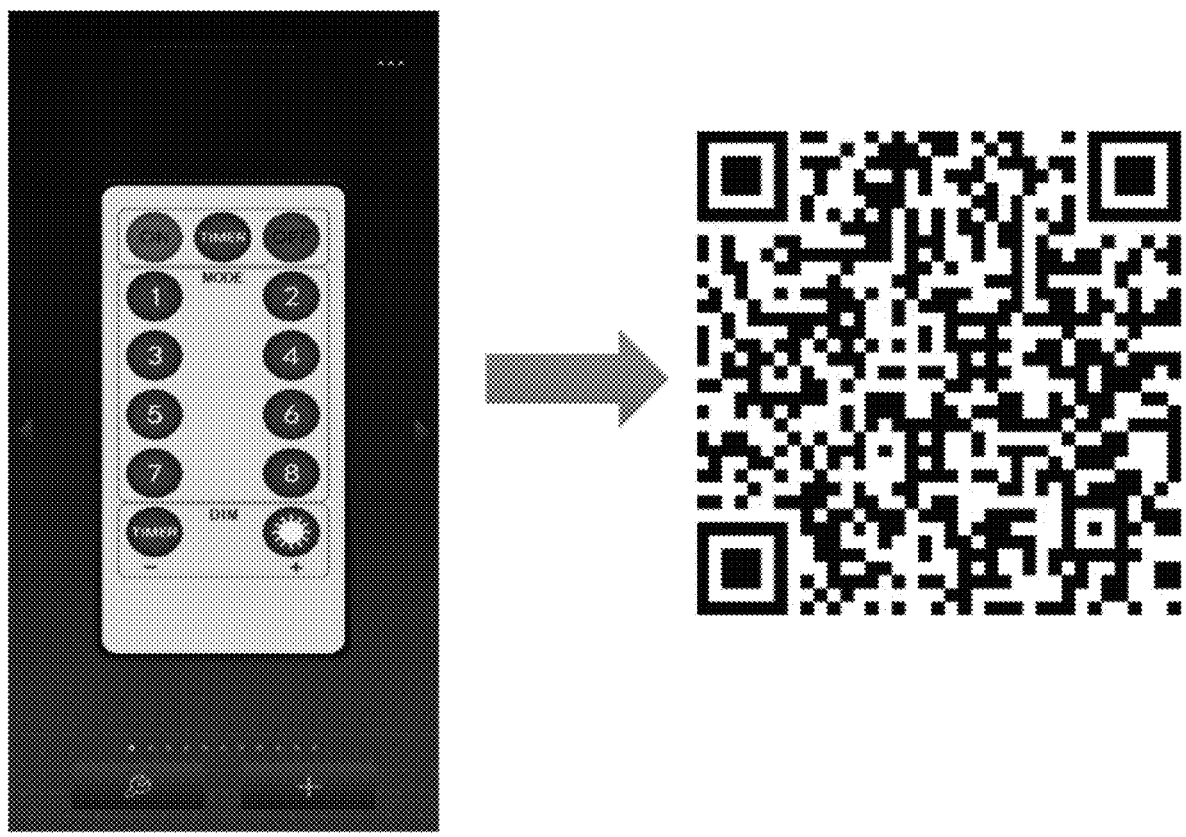
FIG. 3 is a schematic diagram showing the virtual controller and the corresponding QR code.

According to one embodiment, as shown in FIG. 3, a user can scan the QR code with a smart phone, then enter the control interface and control an external device, such as a light string, a light bar, a light strip or a light emitting diode (LED). On the other hand, a physical controller can also be used to control the external device.

Those skilled in the art may clearly understand that, for the purpose of convenient and brief description, only the division of the foregoing functional units or modules is used as an example for description, and in an actual application, the foregoing functions may be accomplished by different functional units or modules as required, that is, the internal structure of the apparatus is divided into different functional units or modules, so as to accomplish all or a part of the functions in the foregoing description. The functional units or modules in the embodiments may be integrated into one processing unit, or each of the units may exist alone physically, or two or more units are integrated into one unit, and the integrated unit or module may be implemented in a form of hardware, or may also be implemented in a form of a software functional unit. In addition, specific names of all the functional units or modules are merely for facilitating the differentiation between each other, but are not intended to limit the protection scope of the present disclosure. For a specific working process of the units or modules in the foregoing system, reference may be made to the corresponding process in the foregoing method embodiments, which is not repeatedly described herein.

In the above embodiments, the description of the embodiments each has a focus, and portions not described in detail or recorded in one embodiment may refer to the related description of other embodiments.

The units described as separate parts may or may not be physically separate. Parts displayed as units may or may not be physical units, which may be located in one position, or may be distributed on a plurality of network units. Some or all of the units may be selected according to actual needs to achieve the objectives of the solutions of the embodiments.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to parts of the technical features thereof; and these modifications and replacements do not make the essence of the corresponding technical solution depart from the spirit and scope of the technical solutions of the embodiments of the present disclosure and should be contained in the protection scope of the present disclosure.

What is claimed is:

1. A wireless receiving circuit, comprising:
   a signal receiving means;
   a BLUETOOTH signal processing means, wherein an output end of the signal receiving means is to be connected with an input end of the BLUETOOTH signal processing means, and the signal receiving means is to receive an external BLUETOOTH signal and transmit the signal to the Bluetooth signal processing means;
   a voltage stabilization means, wherein a voltage end of the BLUETOOTH signal processing means is connected with an output end of the voltage stabilization means; and
   an output control means, wherein:
      an output end of the BLUETOOTH signal processing means is to be connected with an input end of the output control means,
      a voltage end of the voltage stabilization means and a voltage end of the output control means are to be connected with an external power supply,
      the BLUETOOTH signal processing means is to process the external BLUETOOTH signal and transmit a control signal to the output control means,
      the voltage stabilization means is to conduct voltage stabilization processing on the BLUETOOTH signal processing means, and
      the output control means is to control an external device connected with the output control means according to the control signal, and
      the output control means comprises a second resistor, a switch control component, a third resistor, and a communication interface.

2. The wireless receiving circuit of claim 1, wherein the signal receiving means comprises a BLUETOOTH antenna and a first capacitor.

3. The wireless receiving circuit of claim 2, wherein:
   the BLUETOOTH antenna is to be connected with a first end of the first capacitor, and
   a second end of the first capacitor is to be connected with the output end of the signal receiving means.

4. The wireless receiving circuit of claim 3, wherein the signal receiving means further comprises a second capacitor and a third capacitor.

5. The wireless receiving circuit of claim 4, wherein:
   a first end of the first capacitor is to be connected with a first end of the second capacitor,
   a second end of the first capacitor is to be connected with a first end of the third capacitor, and
   a second end of the second capacitor and a second end of the third capacitor are grounded.

6. The wireless receiving circuit of claim 1, wherein the BLUETOOTH signal processing means comprises a Bluetooth signal processing chip, a crystal oscillation unit, and a fourth capacitor.

7. The wireless receiving circuit of claim 6, wherein:
   an input pin of the BLUETOOTH signal processing chip is to be connected with the input end of the BLUETOOTH signal processing means, and
   a first clock pin and a second clock pin of the BLUETOOTH signal processing chip are to be connected with the crystal oscillation unit.

8. The wireless receiving circuit of claim 7, wherein:
   a power supply pin of the BLUETOOTH signal processing chip is to be connected with the voltage end of the BLUETOOTH signal processing means, and
   a signal output pin of the BLUETOOTH signal processing chip is to be connected with the output end of the BLUETOOTH signal processing means.

9. The wireless receiving circuit of claim 8, wherein:
   a first end of the fourth capacitor is to be connected with the power supply pin of the BLUETOOTH signal processing chip, and
   a second end of the fourth capacitor is grounded.

10. The wireless receiving circuit of claim 9, wherein the crystal oscillation unit comprises a first resistor, a crystal oscillation component, a fifth capacitor and a sixth capacitor.

11. The wireless receiving circuit of claim 10, wherein:
    a first end of the first resistor is to be connected with the first clock pin of the BLUETOOTH signal processing chip, and
    a second end of the first resistor is to be connected with a first end of the crystal oscillation component and a first end of the fifth capacitor.

12. The wireless receiving circuit of claim 11, wherein:
    a second end of the crystal oscillation component is to be connected with a first end of the sixth capacitor and the second clock pin of the BLUETOOTH signal processing chip, and
    a second end of the fifth capacitor and a second end of the sixth capacitor are grounded.

13. The wireless receiving circuit of claim 1, wherein the voltage stabilization means comprises a voltage stabilization chip, a seventh capacitor and an eighth capacitor.

14. The wireless receiving circuit of claim 13, wherein:
a voltage pin of the voltage stabilization chip is to be connected with the voltage end of the voltage stabilization means and a first end of the seventh capacitor,
an output pin of the voltage stabilization chip is to be connected with the output end of the voltage stabilization means and a first end of the eighth capacitor, and
a second end of the seventh capacitor and a second end of the eighth capacitor are grounded.

15. The wireless receiving circuit of claim 1, wherein:
a first end of the second resistor is to be connected with the input end of the output control means, and a second end of the second resistor is to be connected with a first end of the switch control component.

16. The wireless receiving circuit of claim 15, wherein:
a second end of the switch control component is connected with a first end of the third resistor and a first end of the communication interface,
a third end of the switch control component is grounded, and
a second end of the third resistor is to be connected with the voltage end of the output control means.

17. The wireless receiving circuit of claim 16, wherein the switch control component is a triode.

18. A wireless control device, comprising:
a wireless receiving means that includes:
a signal receiving means;
a BLUETOOTH signal processing means, wherein an output end of the signal receiving means is to be connected with an input end of the BLUETOOTH signal processing means, and the signal receiving means to receive an external BLUETOOTH signal and transmit the signal to the Bluetooth signal processing means;
a voltage stabilization means, wherein a voltage end of the BLUETOOTH signal processing means is to be connected with an output end of the voltage stabilization means; and
an output control means, wherein:
an output end of the BLUETOOTH signal processing means is to be connected with an input end of the output control means,
a voltage end of the voltage stabilization means and a voltage end of the output control means are to be connected with an external power supply,
the BLUETOOTH signal processing means is to process the external BLUETOOTH signal and transmit a control signal to the output control means,
the voltage stabilization means is to conduct voltage stabilization processing on the BLUETOOTH signal processing modulo means, and
the output control means is to control an external device connected with the output control means according to the control signal, and
the output control means comprises a second resistor, a switch control component, a third resistor, and a communication interface.

* * * * *